United States Patent
Kincaid et al.

(10) Patent No.: US 6,920,448 B2
(45) Date of Patent: Jul. 19, 2005

(54) DOMAIN SPECIFIC KNOWLEDGE-BASED METASEARCH SYSTEM AND METHODS OF USING

(75) Inventors: Robert Kincaid, Half Moon Bay, CA (US); Simon Handley, Palo Alto, CA (US); Aditya Vailaya, Los Altos, CA (US); Parvathi Chundi, Cupertino, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 529 days.

(21) Appl. No.: 10/033,823

(22) Filed: Dec. 19, 2001

(65) Prior Publication Data

US 2002/0169764 A1 Nov. 14, 2002

Related U.S. Application Data

(60) Provisional application No. 60/289,927, filed on May 9, 2001.

(51) Int. Cl.$^7$ ............................................. G06F 17/30
(52) U.S. Cl. ............................................. 707/3; 703/10
(58) Field of Search ........................ 707/1–3, 10, 100, 707/101, 102

(56) References Cited

U.S. PATENT DOCUMENTS

| | | | |
|---|---|---|---|
| 5,924,090 A | 7/1999 | Krellenstein | |
| 6,067,552 A | 5/2000 | Yu | |
| 6,085,186 A | 7/2000 | Christianson et al. | |
| 6,102,969 A | 8/2000 | Christianson et al. | |
| 6,275,820 B1 | 8/2001 | Navin-Chandra et al. | |
| 6,519,586 B2 * | 2/2003 | Anick et al. | 707/3 |
| 6,714,925 B1 * | 3/2004 | Barnhill et al. | 706/48 |
| 2001/0047355 A1 * | 11/2001 | Anwar | 707/5 |
| 2002/0052692 A1 * | 5/2002 | Fahy | 702/19 |
| 2002/0116309 A1 * | 8/2002 | Keyes et al. | 705/36 |
| 2003/0014399 A1 * | 1/2003 | Hansen et al. | 707/3 |

OTHER PUBLICATIONS

Mishra et al, "KhojYantra: an Integrated Metasearch Engine with Classification, Clustering and Ranking", IEEE 2000, pp. 122–130.*

Cutting et al "Scatter/Gather: a cluster–based approach to browsing large document collections", ACM 1992, pp. 318–329.*

* cited by examiner

*Primary Examiner*—Uyen Le (57) ABSTRACT

A system and method for performing domain-specific knowledge based metasearches. A metasearch engine is provided for accessing a searching text-based documents using generic search engines while simultaneously being able to access publication based databases and sequence databases as well as in-house proprietary databases and any database capable of being interfaced with a web interface so as to produce search results in text format. A data mining module is also provided for organizing raw data obtained by unsupervised clustering, simple relevance ranking, and categorization, all of which are done independently of one another. The system is capable of storing previous search data for use in query refinement or subsequent searches based upon the stored data. A search results collection browser may be provided for analyzing current browsing patterns of the user for developing weighting factors to be used in ordering the results of future searches.

52 Claims, 8 Drawing Sheets

DOMAIN SPECIFIC KNOWLEDGE-BASED METASEARCH SYSTEM AND METHODS OF USING

CROSS-REFERENCE

This application claims the benefit of provisional application Ser. No. 60/289,927, which was filed on May 9, 2001, which is incorporated herein by reference in its entirety and to which application we claim priority under 35 USC §119(e).

FIELD OF THE INVENTION

The present invention relates generally to metasearch engines and data mining systems, and more particularly to metasearch engines and data mining systems directed to domain specific knowledge bases.

BACKGROUND OF THE INVENTION

With the rapid growth of the internet and users of the internet over the past five years, a concomitantly rapid increase in the amount of information available over the internet has developed. While, at first blush, this explosion in information available to the user would seem a welcome asset, it carries along with it several downside aspects to the user, not the least of which are the ever increasing difficulties in sorting through the vast quantities of available information to find those information sources which are most pertinent to the search at hand.

Many search engines, such as Google™ and AltaVista®, for example, are available to users and provide powerful search tools for general use. These search engines enable any user to query the vast repository of public web-based documents that are indexed by these systems. However, the sheer volume of available data causes an undesirable result in many of these general searches as most simple searches return large and unmanageable volumes of hits or results, many of which are not useful or relevant to that which the user is seeking.

Most of the available search engines employ different strategies from one another in attempting to find matches to information which is most relevant to the user-supplied search criteria. Therefore, each search strategy imposes its own bias with regard to the relevancy of documents that are retrieved, and one search engine may provide superior results for any given search, while another search engine may provide superior search results for a second, different search. For example, a search engine may determine the relevance of a document by the number of "hits" or matches of any of the key words in the user-supplied query to actual occurrences of those words (or other search terms) in the document. However, the mere repetition of a relevant term is no guarantee that the document is relevant, and often the content of a document identified in this way has little or no relevance to the subject of interest to the user. This results in great expenditures of time, as the user must open documents which are indicated to be relevant, and read them to make a determination as to whether they are in fact relevant, in effect requiring a great deal of "manual searching" by the user to get to the documents actually needed.

Further, different search engines often set different priorities as to which sites to index, and therefore collect disparate results with regard to the same user-supplied query, even prior to making any relevancy assignments.

Another way of attempting to retrieve relevant documents is by filtering, wherein an interface is provided to allow the user to set parameters to arrive at a set of relevant terms. In this way, the user manually determines which items in a set of relevant items delivered are the most relevant. This approach has the potential of eliminating some of the time required to cull through non-relevant documents that might have otherwise been provided by the previous approach discussed. However, time is still required for manual settings. Additionally, the manual settings may potentially eliminate relevant documents which would have otherwise been presented by the previously described approach.

Metasearch engines are available (for example, metacrawler®, Dogpile®, Search.com, etc) which act as a "middle-man" between the user and a number of search engines of the types described above. In this way, a user can submit a single query to a metasearch engine, and the metasearch engine then parses and reformats the query. The reformatted queries are then forwarded to numerous search engines, such as those described above, with each discrete search engine receiving an appropriately formatted query pursuant to the protocols for that search engine. After retrieving the results from the individual search engines, the metasearch engine presents them to the user. Aside from the simplification provided to the user in having to format only one query, a goal of this approach is that by forming a composite of results, relevant documents that may have been missed by any one search engine employed will be found and retrieved by another.

Although these metasearch engines simplify the query task by the user and are thus somewhat useful and provide a measure of time savings, they do nothing to try and categorize or otherwise make sense of the results to make them more quickly accessible. As such, the user is usually left with a very large set of raw results (relatively unordered documents) to examine. Further, these metasearch engines search generic indexes such as Google™ (permission and/or license may be required for metasearching on Google™) or AltaVista® and do not include sites of specific relevance to the sciences.

Current web-based search engines that employ data mining capabilities include northernlight.com, huskysearch and vivisimo. These systems generally employ some type of unsupervised clustering to group documents by similar topics. These systems are an improvement over the generic metasearch engines described above in that the user can see the search results provided in clusters or sub-groups and can then potentially eliminate clusters or sub-groups which appear to have low relevance value and/or can more quickly access those documents in sub-groups which appear highly relevant. In none of these examples, however, have data mining algorithms been tuned specifically to the sciences, or more particularly, the life sciences. Thus, common scientific terminology which has no real discrimination value in a scientific search will be over-weighted, when using these types of systems, as being significant when it is not. Although it is possible to retrieve relevant information to a scientific search using the above generic types of search engines and data mining tools, it is also likely that many relevant documents will not be found, since access to specialized sites (such as PubMed, SwissProt, Entrez, EMBL, etc, in the case of a life sciences search) is not directed.

Attempts at providing domain-specific implementation of metasearch tools have been made which include searchlight.cdlib.org, researchville.com, bio-crawler, gateway.nlm.nih.gov and queryseverver.com. Searchlight provides a few scientifically focused metasearches but has no clustering capability. researchville.com provides a medically oriented implementation, but also lacks any clustering capability. bio-crawler appears to provide biology specific searches in Japanese, but again with no clustering capability. gateway.nlm.nih provides access to various government databases, including medical databases, but also lacks any clustering capability. queryserver.com provides health-oriented metasearches with clustering of results, but is a server-based tool and does not provide the capability of combining both generic and domain specific searches, nor is categorization performed. Being server-based, it's configuration is determined by the server administrator and therefor lacks the potential for end-user customization.

Various client-based solutions for searching have also been proposed. webferret.com provides a simple to use client application that provides metasearch capabilities, but it provides no data mining capabilities and is restricted to a fixed list of generic search engines. DynaCat and QueryCat (http://www.ics.uci.edu/~pratt/) are applications that use a client tool to query domain-specific information within MedLine. These tools are not metasearch engines and thus do not have the capability of querying multiple search engines.

It would be desirable to have domain-specific tools for efficiently performing scientific metasearches and for organizing the results of such searches to enable the user to quickly identify and access the most relevant information discovered.

SUMMARY OF THE INVENTION

The present invention includes a method of performing a domain-specific metasearch and obtaining search results therefrom, the method including providing a metasearch engine capable of accessing generic, web-based search engines, publication sites and sequences sites. The metasearch engine receives a query inputted by a user and accesses sites that are desired to be searched for relevant documents. Once identified, the documents are fetched as raw data search results in the form of text documents from each member of a selected set of search sites. The user displays the raw data on a user interface for immediate access, and the raw data is also simultaneously supplied to a data mining module for analysis and organization of the search results. The data mining module forms clusters of related documents according to an unsupervised clustering procedure and displays the clusters of related documents on the user interface.

The data mining module is further capable of preparing a single list of all of the documents retrieved as raw data, independently of the unsupervised clustering procedure, after eliminating documents not reachable via the web. The data mining module assigns simple relevance scores to the documents based upon a frequency of terms from the query that appear within each document. The documents are then listed in the single list in an order ranging from a highest to lowest simple relevance scores.

Customized stop word lists may be provided which are tailored to individual or groups of generic, web-based search engines, publication sites and sequences sites. The customized stop word lists may be manually provided, such as by providing predefined customized stop word lists, or may be automatically generated, in which case the stop word lists may be prepared and customized for each query directly from the search results without any manual intervention. The data mining module references the stop word lists to strip stop words from the documents associated with a respective engine, publication site or sequence site for which the particular stop word list being referred to has been customized, prior to determining the frequency of terms from the query that appear within each particular document. The list of terms occurring in each document is then used to compute a proximity score (such as by the example explained in further detail in paragraph [0021] below, for instance), to be used for clustering the documents. Customized stop word lists may be automatically generated and tailored to individual or groups of generic, web-based search engines, as well as domain-relevant search engines, including, but not limited to publication sites and/or sequence sites, protein structure databases, pathway information databases and other specific databases. Such a feature eliminates the burden of having to manually prepare/edit these lists which may need to be changed as the generic, web-based search engines, publication sites, sequence sites and other sites change, e.g., as they are updated.

The data mining module is further capable of preparing a single list of all of the documents retrieved as raw data, independently of the unsupervised clustering procedure, after eliminating documents not reachable via the web. The data mining module assigns simple relevance scores to the documents based upon a frequency of terms from the query that appear within each document. The documents are then listed in the single list in an order ranging from a highest to a lowest simple relevance score.

Still further, the data mining module may process the raw data, independently of the unsupervised clustering procedure and the single list generating procedure, to categorize the documents so that each document is assigned to one of a predefined number of categories. A list of words may be provided for each of the predefined categories wherein the words in each list are particular to the respective category. The data mining module compares the words in a particular list to a document to be characterized to determine whether the document is classified in that particular category. Upon completion of categorization, the documents are also displayed in a categorized format to the user interface.

Lists of words which are specific to each of the predefined categories may also be automatically generated, with the words in each list being particular to the respective category for which it is used. The automatic generation may be performed using a training set of documents, each having a known category. A list of words that are the most discriminatory among the predefined categories may then be identified from the training set, with regard to each category. Each word automatically selected for the generation of the word lists may be identified based on a function computed from a frequency of occurrence of the word in the particular category for which it is selected, relative to a frequency of occurrence of the word in the other existing categories.

The lists of words for each of the categories may be automatically selected by incremental training using the previously selected lists of words, categorizing new and old training documents using this list, and taking user feedback regarding the categorization of these documents.

The unsupervised clustering procedure employs a group-average-linkage technique to determine relative distances between documents. A particular example of a group-average-linkage technique that may be employed uses the following algorithm for determining a proximity score that defines relative distances between documents:

$$S_{ij} = 2 \times (\frac{1}{2} - N(T_i, T_j)/(N(T_i) + N(T_j)));$$

where
$T_i$ is a term in document i;
$T_j$ is a term in document j;

$N(T_i,T_j)$ is the number of co-occurring terms that documents i and j have in common;

$N(T_i)$ is the number of terms found in document i; and $N(T_j)$ is the number of terms in document j.

Note that "term" corresponds to a word in a document after the stop words have been removed from the document.

The present invention may also store searches locally and use the data in the stored searches to perform a local search or query-refinement search using the capabilities described above.

A browser including a relevance feedback mechanism may be further provided to analyze the retrieved documents as they are browsed by a user on the user interface. A relevance weighting factor may be generated based upon observations resulting from the analysis. Relevance weighting factors may be applicable to a particular document having been browsed, a site or search engine from which a particular document having been browsed was fetched, or a cluster in which a particular document having been browsed is grouped, for example.

A computer system for performing the above tasks is also provided, as is computer readable media for carrying one or more sequences of instructions from a user of such a computer system.

These and other objects, advantages, and features of the invention will become apparent to those persons skilled in the art upon reading the details of the systems ad methods as more fully described below.

BRIEF DESCRIPTION OF THE DRAWINGS

A more complete understanding of the systems and methods according to the present invention may be obtained by referring to the following detailed description together with the accompanying drawings briefly described hereinafter.

DETAILED DESCRIPTION OF PREFERRED EMBODIMENTS

Before the present systems and methods are described, it is to be understood that this invention is not limited to particular hardware or software described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and systems similar or equivalent to those described herein can be used in the practice or testing of the present invention, the preferred methods and systems are now described. All publications mentioned herein are incorporated herein by reference to disclose and describe the methods and/or systems in connection with which the publications are cited.

It must be noted that as used herein and in the appended claims, the singular forms "a", "and", and "the" include plural referents unless the context clearly dictates otherwise. Thus, for example, reference to "a cluster" includes a plurality of such clusters and reference to "the database" includes reference to one or more databases and equivalents thereof known to those skilled in the art, and so forth.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

Definitions

The term "hit" may be referred to a document that is selected through a search technique by matching a query term with a term existing in that document. Alternatively, when referring to a single document, a number of "hits" may be counted as each individual match of a query term within that document.

The term "URL" is an acronym for "uniform resource locator", which designates the "address" or location of a document, Web site or other information on the world wide web.

The term "user" refers to an agent, human, computer or other mechanism capable of providing a query and of receiving search results.

The term "query" refers to the information that is sent to the metasearch engine to define the subject matter that the user is interested in searching.

Figure 1:
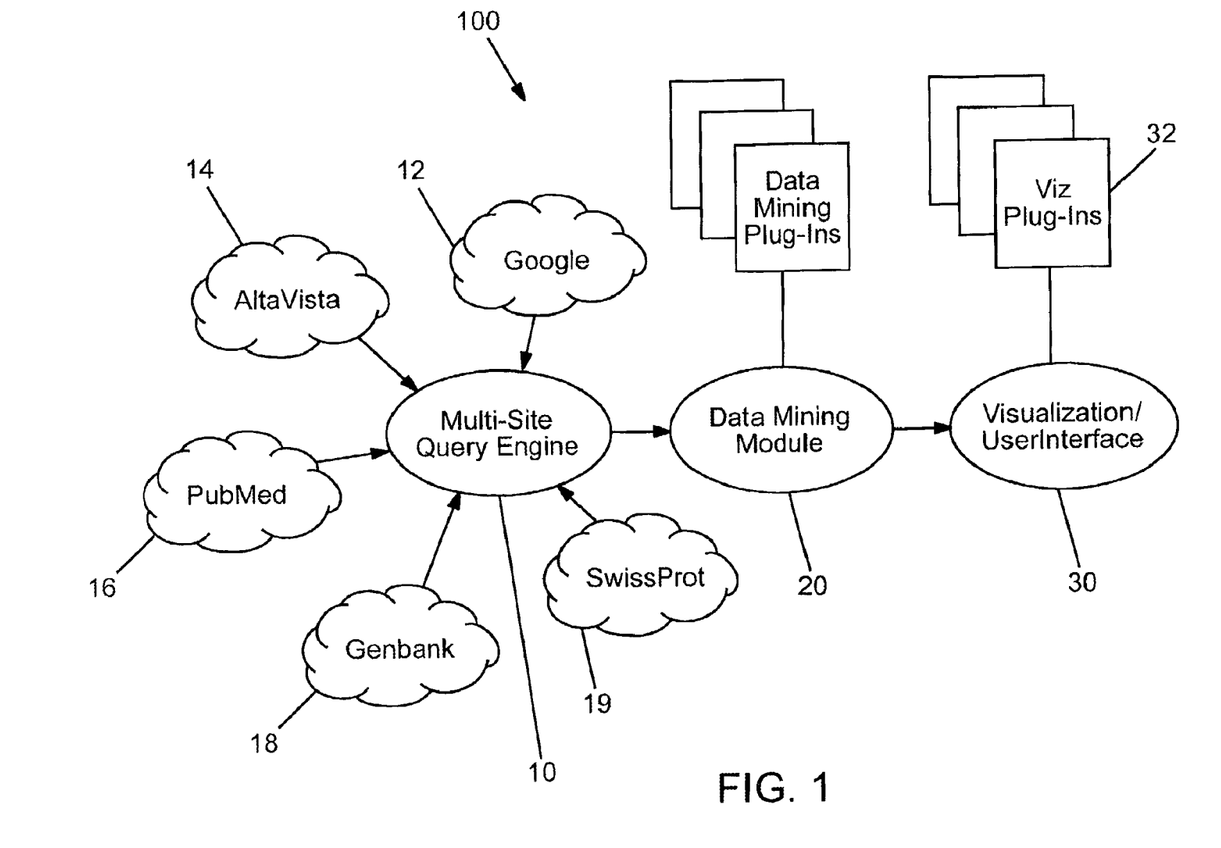
FIG. 1 is an architectural schematic of a system according to the present invention.

Referring to FIG. 1, an architectural schematic of a system for performing searches and data mining according to the present invention is shown. A metasearch (multi-site query) engine 10 is provided with the capability of using multiple search engines to find appropriate web documents for processing. Search terms and requested number of hits are inputted by the user and are used to construct a query URL string for each search engine. The particular URL's are then invoked via http and returned pages are processed to extract the individual search results.

A variety of repositories may be searched including not only standard web-based sites which are accessible by search engines 12 and 14 (such as Google™ (permission and/or license may be required for metasearching on Google™) and Altavista®, for example, although many other generic search engines can be used) but also publication sites including, but not limited to sites such as PubMed 16, GenBank 18, OMIM and others, sequence databases, protein structure databases such as PDB, for example, pathway information databases such as EMP, for example and other data specific sites. Even similar sorts of engines, such as the generic search engines, have different priorities about what sites they search and therefore the present invention is capable of using numerous engines for not only generic sites, but publication sites, and other domain-specific sites. For example, similar engines cycle through different portions of the web to update the site. Different search engines are likely to be in different time lines of where they are updating their indexing, therefore, a more up to date, overall search can be achieved by employing more than one engine for each type of site search.

Similarly, sequence sites and other data specific sites, including, but not limited to sites such as SwissProt 19, Entrez Nucleotide, Entrez Protein, EMBL and PDB may be accessed. Random databases, including those accessible over the world wide web and privately owned or other databases available internally over an intranet may also be accessed. Those databases which are not in a format that can be displayed as web pages can be interfaced with a web interface that enables search results of such a database to be displayed in the form of web pages. For example, an in the case of an in house Java application talking to a relational database, a web interface can be constructed so that the present search system can interface with the relational database and obtain results in the form of web pages. It is noted that most bioinformatics databases already have web interfaces available.

The sites given in the example of FIG. 1 are highly relevant to molecular biology and the life sciences and therefore dramatically improve the domain-specific relevance of search hits in comparison to using standard publicly available search engines. Other content specific publication sites and databases which are specific to other scientific fields can be constructed similarly for domain-specific searches.

An important aspect of the search features of the present invention is its use of text-based data as a data normalization technique. Using this approach, any data that can be reduced to a query returning a web-based text document can be incorporated into the system. Thus, genome and protein sequence data may be included as part of the metasearch, as well as more traditional publication documents. In principle, any system, including in-house proprietary databases, can be wrapped in a CGI(common gateway interface)—based web application server so that its data is also included in a metasearch performed according to the present invention.

Figure 2:
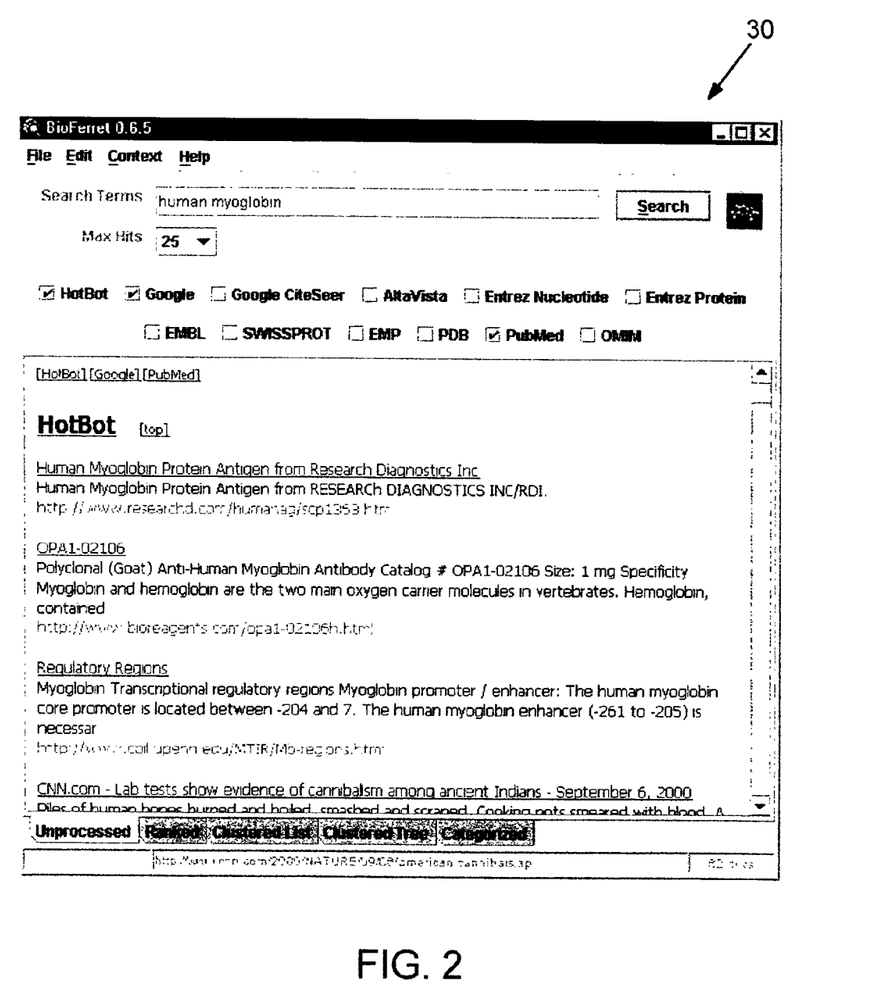
FIG. 2 shows an example of a screen display on a user interface which is displaying the initial raw results of a search conducted using a system according to the present invention.

A list of sites available for searching are provided to the user at the user interface 30, preferably in a visual/graphical manner, such as shown in FIG. 2, for example. In this example, the sites available for searching each have a box provided adjacent thereto which is checked by a user (using a mouse or keyboard to selectively check the box) to select each particular site to be searched. The boxes can also be unchecked in the same manner to deselect a site. In this way the user can easily customize a search by selecting only those sites desired.

Additionally, a "context" menu is provided that allows selections of "presets" of groups of search engines. For example, the "Publication" context may select Citeseer, PubMed and OMIM, as these are all publication oriented sites and may be grouped together as such. The Context menu may also be configured to group presets relating to other scientific fields as well, for example, a "Publication-Physics" context may include Physics specific publication sites. Similarly, a "Sequence" context may be included in the context menu to allow a selection of a group of sequence sites, such as Entrez Nucleotide, Entrez Protein, EMBL, SwissProt and PDB, for example.

The lists of sites to be searched can be easily extended to include additional sites, as an open architecture is provided to allow addition and deletion from the list through the use of plug-ins or other programming modification. Alternatively a centralized repository can be provided in XML language, for example, which can be fetched through the internet or local intranet each time a user links up with the system, or upgrades could periodically be made available through the same channels.

Once the query has been formulated, the search sites have been selected, and the query has been submitted to multi-site query engine 10, engine 10 interrogates the identified generic, web-based search engines and other identified sites with the user-supplied query terms of the query. The results from each engine/site 12,14,16,18,19 are retrieved and parsed to extract the search hits for use later in the process. The search hits are data that are returned from the various search engines, with each containing a URL, title and usually some brief descriptive language. The present invention constructs counterparts to these for data returned from sequence data sites and other domain-specific sites which do not already provide this standard format for a hit. The search hits are combined into an HTML document showing the combined search results. The source document corresponding to each search result is then explicitly fetched and a collection of text documents is created which represents the results of the overall search.

The document data is immediately displayed at visualization/user interface 30, and, at the same time, data mining module 20 begins processing the document data. FIG. 2 shows an example of a screen display on user interface 30 which is displaying the initial raw results of a search conducted using a system according to the present invention. In this example, the following sites were selected for searching: HotBot, Google, and PubMed. The query that was executed was for "human myoglobin". FIG. 2 shows raw results obtained from the HotBot search engine. The results are listed as a title of a document in HTML format such that the document may be directly accessed by the user clicking on the underlined title with a mouse interface or by entering a selection through a keyboard connected with the system. A brief description of the document follows the title and the description is followed by the URL (uniform resource locator) address of the document. The documents are grouped according to each search engine that is being used and may appear with predefined relevance rankings, if any, according to schemes used by that particular search engine. That is, the results are listed in the order that they appear with regard to each particular search engine. In some cases, like Google, the results may be listed in an order corresponding to some scheme for relevancy ranking. In other cases, like for sequence databases, the results may be presented merely by the order in which the hits were identified or located, or by alphabetical order. Whatever the case, the present invention does not attempt to interpret the order in which the results are displayed at this stage of processing.

The raw results are displayed immediately upon retrieval, at the same time that they are supplied to the data mining module for further processing, so that the user may begin browsing the raw results at the same time that data mining processing is being carried out. This provides the user the opportunity of manually identifying one or more highly relevant documents even as further processing is carried out, which would save the user time in such an event.

In reviewing the list of raw data from HotBot in FIG. 2, it can be seen that three of the documents shown relate to cannibalism in the $12^{th}$ Century Southwest by Anasazi Indians. Although this information could be highly relevant for a specific search regarding cannibalism, it is not likely to be relevant to many scientific searches relating to technical details of human myoglobin. As such, this is a good example of how generic databases and search engines can return documents marked "highly relevant" which are really not relevant at all to a specific scientific inquiry.

Processing by data mining module 20 processes the raw data to prepare a single list of documents from all of the sites searched, wherein the documents are ranked by simple relevance scores. In preparing this list, data mining module 20 fetches URL's individually for data mining. All items/documents that were not reachable via the web, either due to networking problems or because the page no longer exists are removed from the list. Further, data mining module 20 strips off all HTML text formatting.

Figure 3:
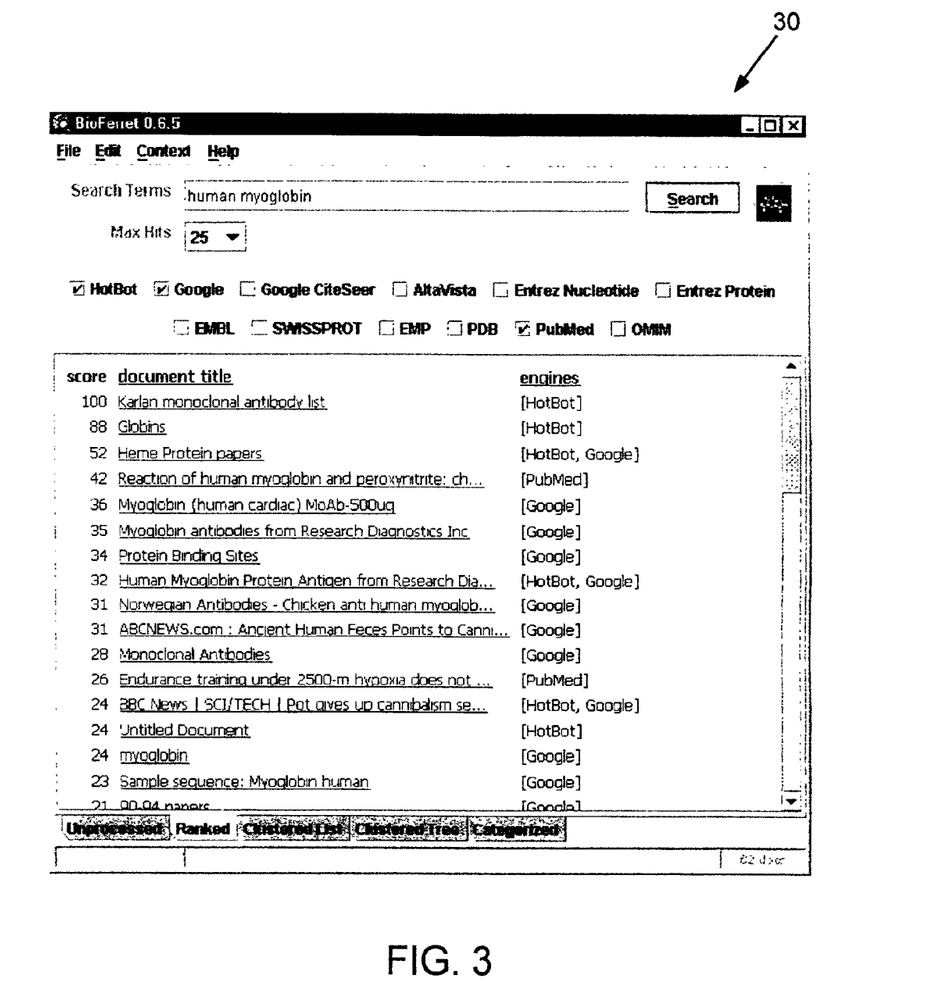
FIG. 3 shows an example of a screen display on a user interface which is displaying document search results according to simple relevance ranking.

A simple relevance ranking is then generated based upon the frequency of the search terms that are found within any particular document (e.g., a total number of "hits" of search terms within a document is tallied. A weighting function may also be applied to hits that occur in a title, for example, or other likely more relevant location, such as an abstract). The raw relevance scores are then normalized to a scale of 1 to 100 and the documents are listed according to decreasing relevance scores. A display of document search results according to simple relevance ranking on user interface 30 is shown in FIG. 3.

As noted above, the first procedure in the data mining process is to remove documents having "dead" or invalid URL entries from the list of results. Duplicate entries are also removed at this time. As can be seen in FIG. 3, a double occurrence of the document "ABQjournal" has been compressed to a single occurrence on the list of results. The fact that this entry had a double occurrence is evidenced by the listing of HotBot twice under the "Engine" column. A simple relevance score is also computed for the display at this stage of processing (shown under the "Score" column in FIG. 3) and the search results are listed in descending order according to their simple relevance score.

The simple relevance score may be computed as follows: for each document, the number of times each search term is found is counted and tabulated. For example, with regard to the search for "human myoglobin", if there are three occurrences of "human" in a particular document and five occurrence of "myoglobin", then that document receives an initial score of eight. Next, the title of the document, as constructed by the results parser of the present invention (as opposed to the official HTML title) is parsed for the same search terms. Each occurrence in the title counts for a weighted value (a value of ten, for example, although weighting can certainly be varied to take on some other value), since it is expected that when a search term appears in the title there is a higher probability that the document will be relevant to the search. So, to follow with the example, if the document described contained one occurrence of "myoglobin", the total score for the document would be eighteen (8+10). The scores for each document are then normalized so that the maximum score for the total search is "100" and so that scores range from "0" to "100". Normalization is accomplished by simply finding the maximum score and then multiply each score by (100/maximum score).

The relevance scoring technique provided above is just one example of simply calculating statistics against the identified documents as a way of "predicting" relevancy to the information that the searcher desires. Any number of various statistical and/or weighting schemes could be employed in this process and the present invention is not to be limited to the specific example provided. Further multiple metrics may be used to provide more than one way of ranking for relevancy and then the user can be provided the opportunity to sort the document results by choosing whichever metric thought to be best suited for the particular search. Of course, the first metric chosen need not be solely relied upon, but could be compared with others by selecting and sorting according to another metric.

The next phase of the data mining procedure involves the clustering of similar documents together in groups or clusters. A wide search which searched disparate sites/databases as described herein can give results that a user wouldn't expect to find, such as the "cannibalism" documents identified herein when searching "human myoglobin". In such a situation, clustering is an effective way of sorting such documents together in a group, so that they can be dealt with simultaneously. A simple document clustering procedure is performed, during which documents are grouped or clustered based on unsupervised clustering, wherein documents are grouped according to similarity of content without any other intervention. At a high level, a similarity measure is first defined to assess how similar a pair of documents are. An example of a similarity measure is the proximity score "$S_{ij}$" (defined below) although other algorithms can be substituted for use as a similarity measure.

Custom stop word lists may also be provided which are tailored to the specific site that is being searched. An example of this would be to include the word "sequence" as a stop word for the custom stop word list used in searching a sequence database, as this word is used ubiquitously in such a database and has relatively little discrimination value, since it is already known that all, or substantially all of the documents to be searched in such a database pertain to sequences. On the other hand, the word "sequence" may have significant discriminatory value when searching a generic site and thus would not be included in the custom stop word list referred to when searching Google™, for example.

The present invention may automatically generate stop word lists customized to each site by identifying site specific stop words and removing these words from the documents in respective sites before clustering the documents. One technique for such automatic generation involves preparing a list of words, specific to each site, wherein each word in the list is a word that is contained in all documents found at that particular site. The underlying assumption for concluding that such words are stop words for that site, is that they have no discriminatory value to that site, since all of the documents retrieved from that site contain those particular words. Many times these words will appear in the headings or links on the site of the search engine. Since these words may change as the search engine site is modified, or even for different searches performed on the same unmodified site, an automatic preparation of the stop words, created "on the fly" for each query may be provided for better tailoring of results. These stop words are used to filter out site-specific words and words with low discrimination value from documents retrieved from each search engine site. The terms (after having removed the stop words) present in a document are then used to compute the proximity scores between the documents.

Once the similarity measure has been defined, a number of different techniques may be used to cluster the documents (e.g., partitional clustering, hierarchical clustering, etc.). In one example, a technique referred to as group-average-linkage hierarchical clustering is performed. According to this technique, each document is first placed into an individual cluster, so that the total number of initial clusters equals the total number of documents. A comparison is then made on a cluster to cluster basis, using a similarity measure (such as a proximity score, for example), to determine which clusters are the most similar, as determined by the highest similarity or proximity score. Once two clusters have been combined into a single cluster (as in forming a cluster having two documents in the first round of the procedure) the similarity or proximity scores of every other cluster are recomputed with respect to the newly created cluster using the group average similarity or proximity score. It is noted that with each "round" or "step", a new cluster is created from two previously existing clusters having the highest similarity or proximity score with respect to one another. Thus, for example, if cluster "i" is combined with cluster "j" in the current round to form cluster "k", then during recomputation of proximity scores, the proximity score between pre-existing cluster "l" and newly formed cluster "k" is determined by computing the average of the proximity score of cluster "i" to cluster "l" and cluster "j" to cluster "l", and weighed by the number of terms in cluster "i" and cluster "j". The clustering process continues round by round until a stop condition is reached, which may be a predetermined proximity score limit, a predefined number of final clusters, or the like.

An algorithm that can be used by the data mining module for the clustering procedure according to the above-described group-average-linkage technique is described hereafter. A proximity score $S_{ij}$ representing the distance between two documents "i" and "j" can be computed as follows:

$$S_{ij}=2\times(\tfrac{1}{2}-N(T_i,T_j)/(N(T_i)+N(T_j));$$

Where $T_i$ is a term in document i;

$T_j$ is a term in document j;

$N(T_i,T_j)$ is the number of co-occurring terms that documents i and j have in common;

$N(T_i)$ is the number of terms found in document I; and $N(T_j)$ is the number of terms in document j.

By normalizing the scores as described above, identical documents (i.e., two documents having all terms in common) will have a proximity distance of zero (0), while completely orthogonal documents (i.e., having no terms in common) will have a proximity score of one (1). The hierarchical clustering procedure may be run until all the documents fall into one cluster. In order to view the results of the hierarchical clustering, a stop point can be set by the user to display the status of the results of the hierarchical clustering at any round or step intermediate of the processing, i.e., after beginning the clustering process, but before all documents have been subsumed into a single cluster. Thus, a stop point can be set for a pre-set number of clusters, or when the proximity scores become greater than or equal to some pre-defined value between zero and one. Combinations of stop points can be set, such that display of clusters occurs whenever the first stop point is reached.

Figure 4:
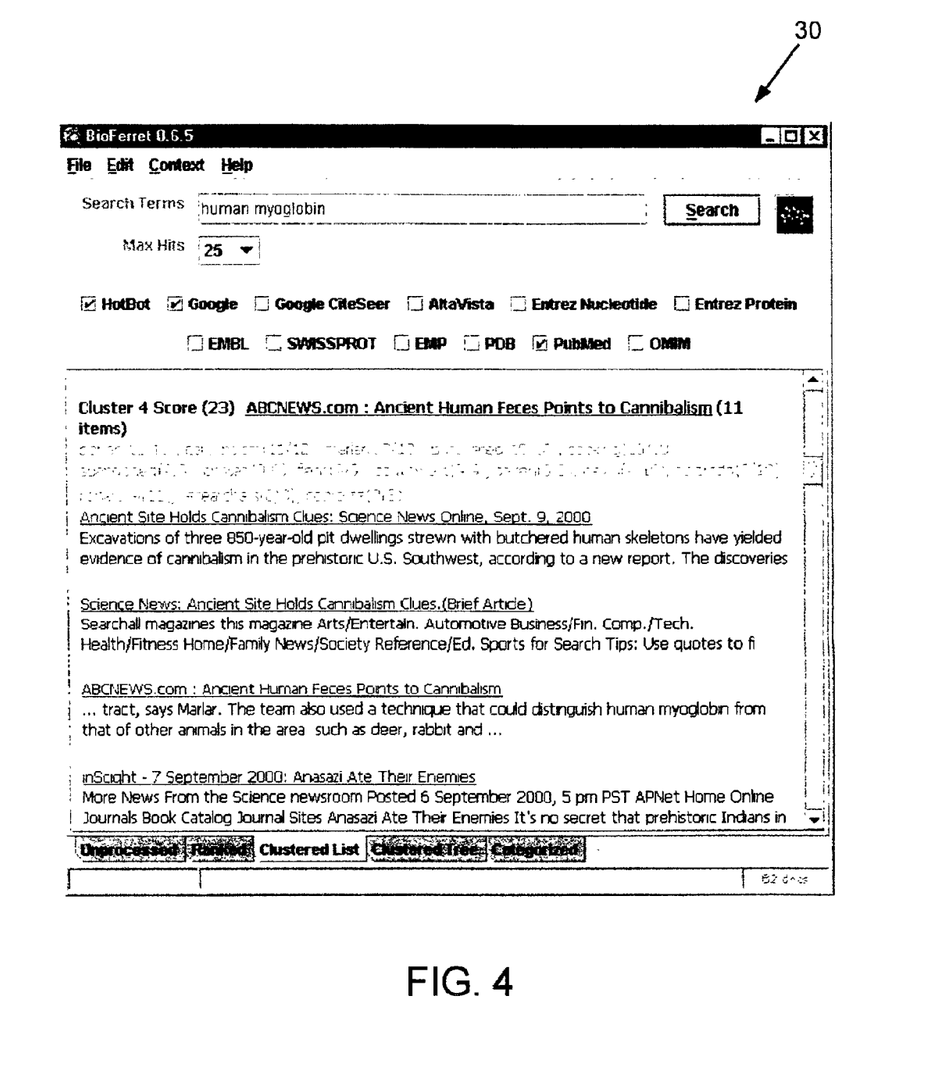
FIG. 4 shows an example of a screen display on a user interface which is displaying an example of a cluster formed according to the present invention.

An example of a cluster is displayed in FIG. 4 on user interface 30. In this example, Cluster 3 identifies a group of similar documents identified in the "human myoglobin" search described above, all of which relate to finding the substance in archeological digs that indicate that the Anasazi Indians may have practiced cannibalism. By clustering these documents about this particular topic, all of the documents relating to cannibalism in the Anasazi tribe can be examined together, and, if not particularly relevant, can be efficiently eliminated from further browsing. On the other hand, if this topic is of interest, all documents relating to the topic are conveniently group for retrieval and browsing without having to browse the rest of the data.

Figure 5:
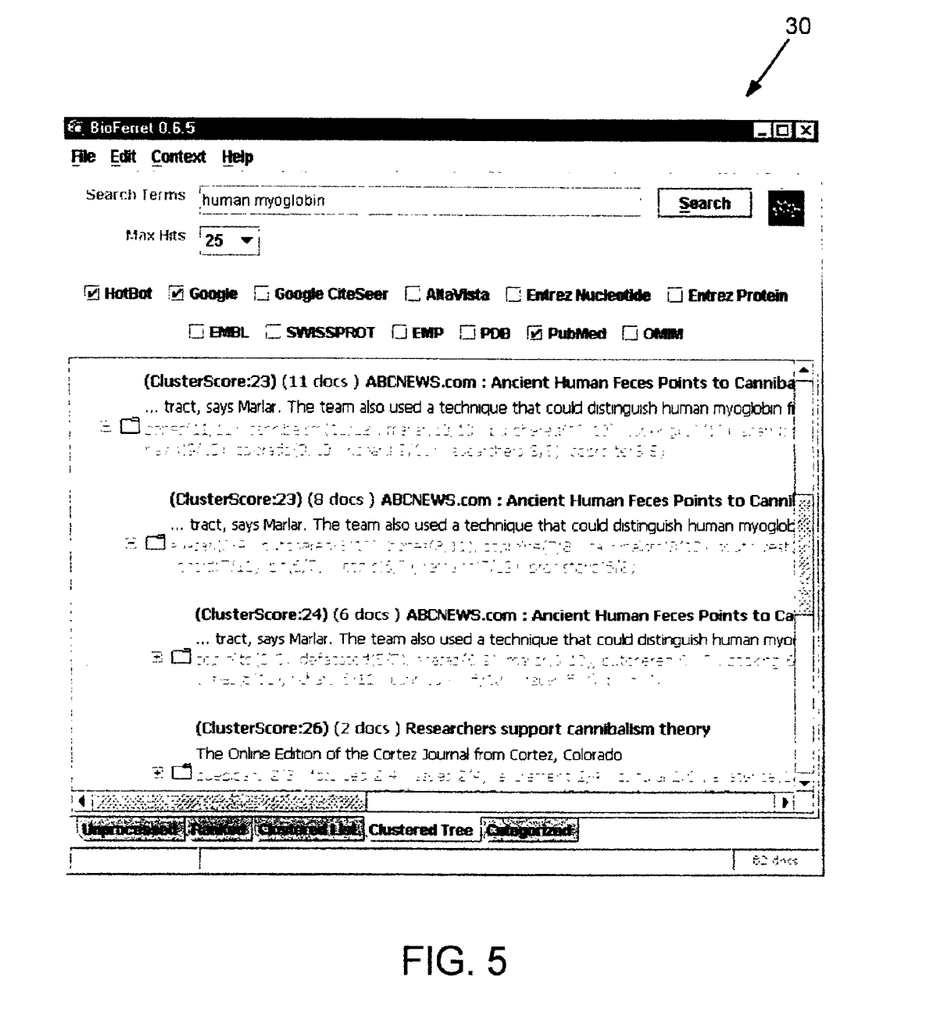
FIG. 5 shows an example of a screen display on a user interface which is displaying the same cluster identified in FIG. 4, but in a tree hierarchy format.

FIG. 5 shows the same cluster identified in FIG. 4, but displayed in tree hierarchy. The tree hierarchy form of display allows the user to delve deeper into clusters to see which documents are most closely related within a cluster. Whereas the "list" view of clusters shown in FIG. 4 represents an arbitrary cut-off as to where to define the cluster, by navigating the tree structure (FIG. 5) of the underlying cluster hierarchy, no such cut-off needs to be made. With appropriate data displayed on the user interface, the user can then determined which documents are closely related and which are not. The downside of the tree hierarchy is that it can be more tedious to navigate which can in some ways compound the problems inherent in navigating a larger number of search results. However, this view does give the user another option and sometimes will be more advantageous than using the list format.

A document classifier function may also be included such that the data mining module 20 classifies the documents according to predefined categories such as "Publications", "News", "Product Information", "Sequences" and "Miscellaneous", etc. According to this classification scheme, data mining nodule 20 consults a list of words for each category, with the lists containing words that are particular to the category being examined. The lists of words which are specific for each category may be either manually generated or automatically extracted, with the words in each list being particular to the respective category for which it is used. The automatic generation is performed using a training set of documents which have been categorized, such that each document has a known category. A list of words that are the most discriminatory among the predefined categories is then identified from the training set, with regard to each category, and an automated procedure selects the lists of words automatically from the training set. The word which are "most discriminatory" are those which are identified by their occurring most often in one category as compared to low occurrences in other categories. The learning of the lists of words can be performed incrementally, by selecting the previous list of words for a given category, the categorization resulting therefrom and user feedback regarding the accuracy of categorization of a set of documents, to generate the list of discriminatory words for each category, respectively.

A score is computed for each raw document to belong to a specific category based on the frequency of occurrence of each word in the word list of the specified category. The document is categorized into the category receiving the maximum score. If the number of unique words in the document matching those present in the list for the category getting the maximum score is less than a threshold (category-specific threshold, which may be user specified) then the document is classified into the Miscellaneous category. The order in which the categorization proceeds is not critical. In the example provided above, all of the documents relating to cannibalism were "News" stories and were grouped together as "News" by the categorization algorithm.

Figure 6:
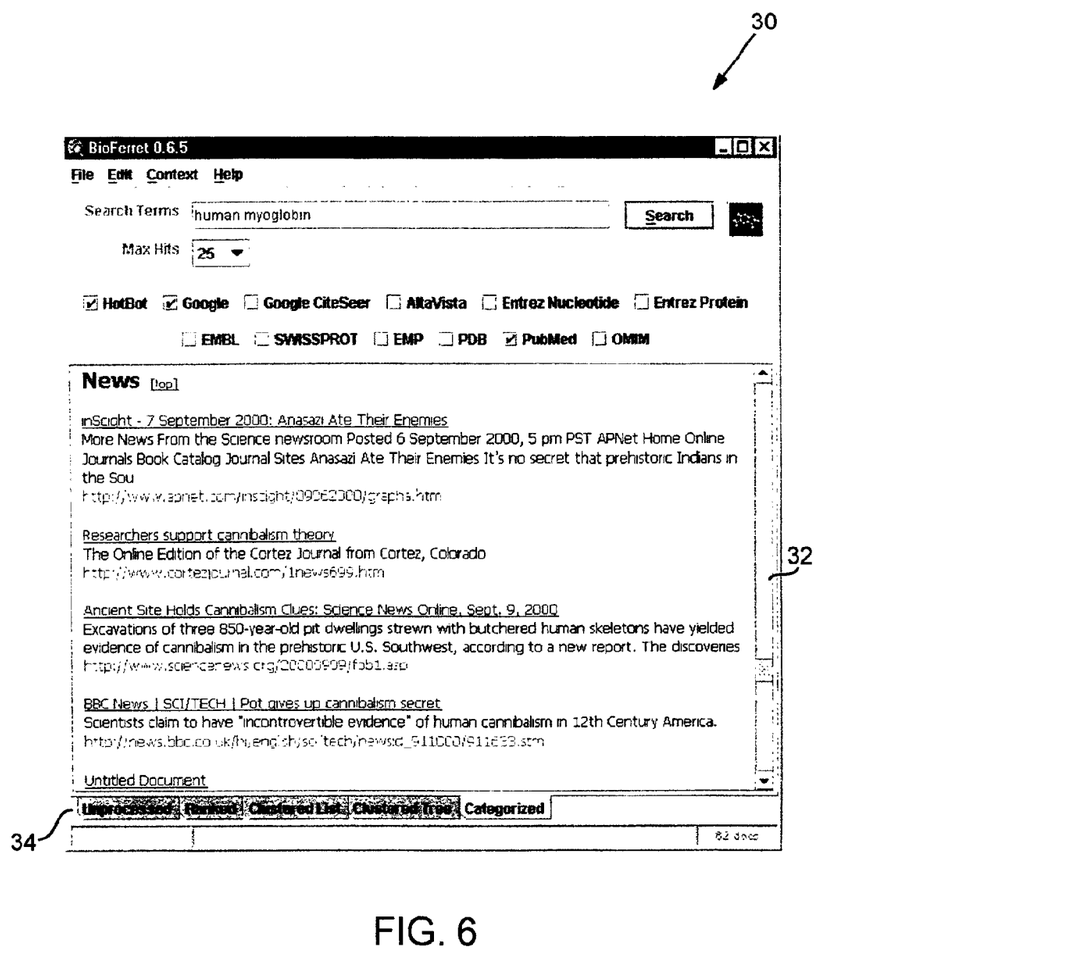
FIG. 6 shows an example of a screen display on a user interface which is displaying search documents according to categories.

FIG. 6 shows a screen display on user interface 30 that lists the search documents according to categories. Although only documents which are grouped in the "New" category" are shown in FIG. 6, the user would be able to readily access the other categories of documents (e.g., "Publications", "News", "Product Information", "Sequences" and "Miscellaneous", by scrolling upwardly or downwardly with the side scroll bar 32.

After having performed the data mining procedures for simple relevance ranking, clustering (list and tree) and categorization as described above, the results of the differing organizational views of the data prepared by these data mining procedures are then displayed on the user interface 30 upon selection of the corresponding button from button bar 34 (see FIGS. 2–6). Thus, a user is able to select search results to be presented in any of the available formats, i.e., simple relevance, clustered (list or tree format), categorized, by simply selecting the button for the desired format, in addition to the per-site raw data view that is provided initially, as described above. The selections can be made in any order and the user may find it valuable to browse more than one format to help identify the most relevant information.

Figure 7:
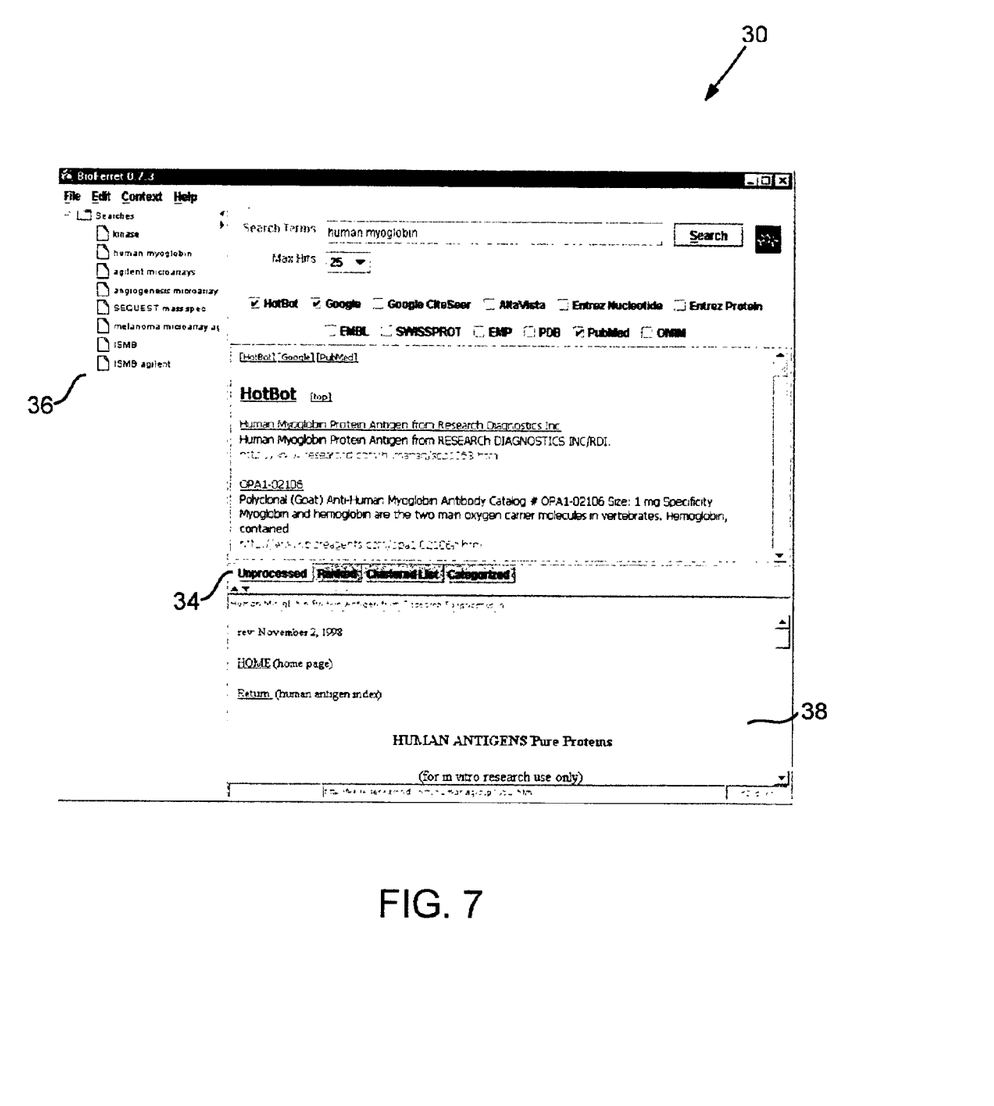
FIG. 7 shows an example of a screen display on a user interface which shows a query refinement feature according to the present invention.
Figure 8:
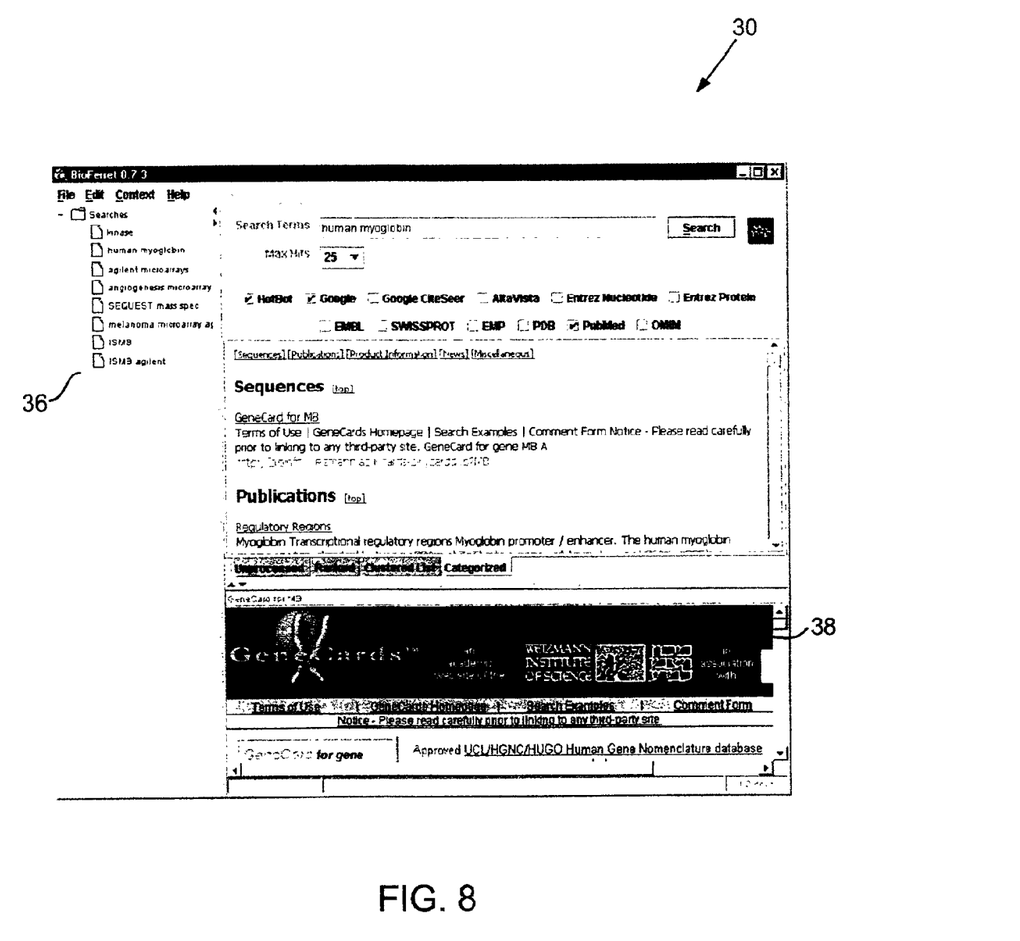
FIG. 8 shows an example of a screen display on a user interface which shows a Search Results Collection Browser according to the present invention.

FIG. 7 shows a display on user interface 30 of a further feature which may be employed with the present invention. A Query Refinement feature may be provided to effectively carry out a query within a query. For example, if a user has previously performed three or four searches relating to "human myoglobin", the results of these searches can each be saved to a local database. The stored searches can be displayed in a side window 36, as shown in FIGS. 7 and 8. The raw results view and the internal data structures corresponding to the entire results set are saved in the local database. When restoring the data from the local database, the ranking, clustering and categorization groupings are recalculated.

A sub-query or query refinement can then be conducted during a subsequent related search to obtain results from the stored results of the previous searches. The data mining module 20 can process results from the query refinement in the same manners as discussed above. Because the sub-query searches only presumably relevant information, and because the search is performed only on an internal database, this search can potentially return very relevant information in very little time.

As another feature, a Search Results Collection Browser may be included in the present system, as shown in FIGS. 7 and 8, wherein an integrated frame 38 on the user interface 30 puts an additional frame (in this case, an Internet Explorer frame) inside the system application (in this case, a Java application), to view all browser events going on. The Search Results Collection Browser includes a relevance feedback mechanism which analyzes the browsing to determine which document the user spends the most time with, to learn what relevant documents look like. Of course the term "relevant documents" is defined here by the user's tastes and needs, and, over the course of several to many searches, if a searcher tends to research a particular area of science, the relevance feedback mechanism will begin to associate recurrent themes of browsing and times spent with similar documents. Thus, based upon the user's historical preferences, a more sophisticated weighting algorithm can be developed by the Search Results Collection Browser to be applied as a weighting factor to documents being ranked in a current search and data mining operation.

The Search Results Collection Browser learns by watching browsing habits when using the metasearch and data mining system described herein. The browsing and time spent information is then used to predict subsequent relevance to search results. Hooks are provided in the Search Results Collection Browser so that when a user clicks on or otherwise selects a document for examination, the document shows up in the Search Results Collection Browser window, and the hooks monitor the amount of time that the user spends looking at that document. The "hooks" are supplied by embedding an Internet Explorer frame within the application to be used as a "preview frame" 38. Internet Explorer exposes interfaces that can be called to provide notification whenever the user performs certain actions, to include opening a particular page for viewing. By such notification, the present invention can track how long a page is being displayed in the preview frame 38, as well as how much the user interacts with it.

The present invention monitors any action in which the user clicks or drags on an area of the preview frame 38, such actions including accessing scroll bars, pop-up menus, internal hyperlinks, or even clicking on an inactive spot of the HTML page, for example. The time span and frequency with which the user "touches" this window (by clicking or dragging, for example) may then be used as a metric of their interest in the page. If the user clicks on a hyperlink to launch a new page referenced by the previewed page, the new page is launched in an external window, which may optionally be tracked, but, by default, is not tracked. The more time or activity spent with a particular document, the heavier the weighting factor that will be applied to that document in a prospective search. Over time, the reliability of this type of weighting factor increases, as it becomes more accurate at predicting the types of documents that the user tends to look for.

Alternatively or additionally, the Search Results Collection Browser may also monitor, store and analyze browsing habits on a site specific basis. For example, if a user spends 80% of the search time accessing documents in a particular sequence database, more weight can be given to documents identified in a later search from that particular database.

In another aspect that may be provided with the Search Results Collection Browser, the Search Results Collection Browser may examine the contents of the document that the user is looking at and try to determine if the content is relevant. For example, the Search Results Collection Browser may attempt to determine whether the overall topic or content of the particular document pertains to what the user is currently searching for, or whether it is similar to the content of documents that are being searched for. A distance metric, such as that described with regard to the clustering function above may also be used here. In such a situation, the Search Results Collection Browser would compare the current document that the user is browsing with the saved contents of all the documents in the previous searches having been saved from past searches, to determine whether any other documents may be relevant with the current document so as to form a cluster.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, system, system component, processor, process step or steps, to the objective, spirit and scope of the present invention. All such modifications are intended to be within the scope of the claims appended hereto.

That which is claimed is:

1. A method of performing a domain-specific metasearch and obtaining search results therefrom, said method comprising the steps of:
   providing a metasearch engine capable of accessing generic, web-based search engines and domain-relevant search engines;
   receiving a query inputted by a user to the metasearch engine and searching for documents on a selected set of said generic, web-based search engines and domain-relevant search engines which are relevant to the query;
   fetching raw data search results in the form of text documents from each member of the selected set;
   displaying the raw data on a user interface;
   supplying the raw data to a data mining module, wherein the data mining module forms clusters of related documents according to an unsupervised clustering procedure and wherein the data mining module, upon receiving the raw data, processes the raw data, independently of the unsupervised clustering procedure, and prepares a single list of all the documents, after eliminating documents not reachable via the web; and
   displaying the clusters of related documents on the user interface.

2. The method of claim 1, wherein the unsupervised clustering procedure performed by the data mining module employs a group-average-linkage technique to determine relative distances between documents.

3. The method of claim 2, wherein the group-average-linkage technique employs the following algorithm for determining a proximity score that defines the relative distances between documents:

$$S_{ij}=2\times(\frac{1}{2}-N(T_i,T_j)/(N(T_i)+N(T_j)));$$

where
   $T_i$ is a term in document i;
   $T_j$ is a term in document j;
   $N(T_i,T_j)$ is the number of co-occurring terms that documents i and j have in common;
   $N(T_i)$ is the number of terms found in document i; and
   $N(T_j)$ is the number of terms in document j.

4. The method of claim 1–3, wherein the data mining module assigns simple relevance scores to the documents prepared in the single list, based upon a frequency of terms from the query that appear within each of the documents.

5. The method of claim 4, further comprising displaying the single list on the user interface.

6. The method of claim 4, wherein the documents are listed in the single list in an order ranging from a highest of the simple relevance scores to a lowest of the simple relevance scores.

7. The method of claim 1, further comprising the step of providing customized stop word lists to be used with regard to the generic, web-based search engines and domain-relevant search engines, wherein the data mining module references the stop word lists to strip stop words from documents associated with a respective generic, web-based engine or domain-relevant engine for which the particular stop word list being referred to has been customized, prior to determining the frequency of terms from the query that appear within each of the documents and computing a similarity score between results.

8. The method of claim 7, wherein the step of providing customized stop word lists comprises providing predefined customized stop word lists.

9. The method of claim 7, wherein the step of providing customized stop word lists comprises automatically generating stop word lists which are prepared and customized for each query.

10. The method of claim 1, wherein the data mining module, upon receiving the raw data, processes the raw data, independently of the unsupervised clustering procedure, and categorizes the documents so that each document is assigned to one of a predefined number of categories.

11. The method of claim 10, further comprising providing a list of words for each of the categories wherein the words in each list are particular to the respective category, and wherein the data mining module compares the words in a particular list to a document to be characterized to determine whether the document is classified in that particular category.

12. The method of claim 11, wherein the step of providing a list of words for each of the categories comprises providing predefined lists.

13. The method of claim 11, wherein the step of providing a list of words for each of the categories comprises automatically generating the word lists which are prepared from a set of training documents.

14. The method of claim 13, wherein each word automatically selected for the generation of the word lists is identified based on a function computed from a frequency of occurrence of the word in the particular category for which it is selected, relative to a frequency of occurrence of the word in the other existing categories.

15. The method of claim 11, wherein the step of providing a list of words for each of the categories comprises automatically generating the word lists which are prepared by incremental training using previously selected lists of words and corresponding categories, as well as user feedback regarding the categorization of at least one of the documents.

16. The method of claim 10, wherein, upon completion of categorization of the documents, the documents are displayed in a categorized format to the user interface.

17. The method of claim 1, wherein the metasearch engine is further capable of accessing in-house, proprietary databases and any other informational databases that can be wrapped in a CGI-based web application server.

18. The method of claim 1, further comprising the steps of:
   displaying a list of the generic search engines and domain-relevant search engines on the user interface which are available for searching; and
   receiving a selection of all or part of the list from the user for directing the query thereto.

19. The method of claim 18, further comprising providing a context menu by which a user can select a group of search sites or engines by selecting a single context entry.

20. The method of claim 19, wherein the context menu includes at least one of the presets selected from the group consisting of a publications preset which selects more than one publications site, a sequences preset which selects more than one sequences site, a generic, web-based search engines preset which selects more than one generic, web-based search engine, a protein structure databases preset which selects more than one protein structure database, and a pathway information databases preset which selects more than one pathway information database.

21. The method of claim 1, wherein the documents consist of text-based data.

22. The method of claim 1, further comprising the steps of
storing at least one of the raw data and the clusters;
performing the steps of claim 1 to accomplish an additional search and data mining procedure;
storing at least one of the raw data and the clusters obtained from the additional search and data mining procedure;
receiving a sub-query inputted by a user to the metasearch engine and searching for documents from the data stored by the storing steps performed in regard to previous searches; which are relevant to the sub-query;
fetching raw data sub-query search results in the form of text documents from the stored data;
displaying the raw data sub-query search results on a user interface;
supplying the raw data sub-query search results to the data mining module, wherein the data mining module forms clusters of related documents according to an unsupervised clustering procedure; and
displaying the clusters of related documents resultant from the sub-query search on the user interface.

23. The method of claim 1, further comprising:
providing a browser including a relevance feedback mechanism;
analyzing the documents as they are browsed by a user on the user interface; and
generating a relevance weighting factor based upon observations resulting from the analyzing.

24. The method of claim 23, wherein the relevance weighting factor is applicable to a particular document having been browsed during the analyzing.

25. The method of claim 23, wherein the relevance weighting factor is applicable to a site or search engine from which a particular document having been browsed during the analyzing was fetched.

26. The method of claim 23, wherein the relevance weighting factor is applicable to a cluster in which a particular document having been browsed during the analyzing is grouped.

27. The method of claim 23, wherein the relevance weighting factor is applicable to a category in which a particular document having been browsed during the analyzing is categorized.

28. The method of claim 1, further comprising:
storing at least one of the raw data and the clusters;
performing the steps of claim 1 to accomplish an additional search and data mining procedure;
providing a browser including a relevance feedback mechanism;
analyzing the documents displayed from the additional search as they are browsed by a user on the user interface, wherein the analyzing includes comparing the documents being browsed with the stored data; and
generating a relevance weighting factor based upon observations resulting from the analyzing.

29. A method of performing a life science-specific domain-specific metasearch and obtaining search results therefrom, the method comprising the steps of:
providing a metasearch engine capable of accessing generic, web-based search engines, publication sites, sequences sites, protein structure databases and pathway information databases;
receiving a query inputted by a user to the metasearch engine and searching for documents on a selected set of the generic, web-based search engines, publications sites, sequences sites, protein structure databases and pathway information databases which are relevant to the query;
fetching raw data search results in the form of text documents from each member of the selected set;
displaying the raw data search results on a user interface;
supplying the raw data to a data mining module specifically for the life sciences, wherein the data mining module prepares a single list of all of the documents, after eliminating documents not reachable via the web, and assigns simple relevance scores to the documents prepared in the single list; forms clusters of related documents according to an unsupervised clustering procedure; and categorizes the documents so that each document is assigned to one of a predefined number of categories; and
displaying the documents in a format defined by the single list, in a format defined by the clusters, and in a format defined by the categories on the user interface so that a user can choose to browse the documents according to the list format, cluster format or categories format.

30. A method of performing a domain-specific metasearch and obtaining search results therefrom, said method comprising the steps of:
providing a metasearch engine capable of accessing generic, web-based search engines and domain-relevant search engines;
receiving a query inputted by a user to the metasearch engine and searching for documents on a selected set of said generic, web-based search engines and domain-relevant search engines which are relevant to the query;
fetching raw data search results in the form of text documents from each member of the selected set;
supplying the raw data to a data mining module, wherein the data mining module forms clusters of related documents according to an unsupervised clustering procedure, data mining module, upon receiving the new data, processes the raw data, independently of the unsupervised clustering procedure, and prepares a single list of all of the documents, after eliminating documents not reachable via the web and wherein the data mining module categorizes the documents so that each document is assigned to one of a predefined number of categories; and
displaying the documents in a format defined by the clusters, and in a format defined by the categories on a user interface so that a user can choose to browse the documents according to the cluster format or the categories format.

31. The method of claim 30, further comprising:
storing at least one of the raw data and the clusters;
performing the steps of claim 30 to accomplish an additional search and data mining procedure;
providing a browser including a relevance feedback mechanism;
analyzing the documents displayed from the additional search as they are browsed by a user on the user interface, wherein the analyzing includes comparing the documents being browsed with the stored data; and generating a relevance weighting factor based upon observations resulting from the analyzing.

32. A computer system for searching both general and domain-specific information resources simultaneously pursuant to a user query and for obtaining organized search results therefrom, the system comprising:

a metasearch engine capable of accessing a plurality of sites including generic, web-based search engines and domain-relevant search engines, for receiving documents from said plurality of sites in response to the user query;

means for selecting particular search engines from a plurality of generic, web-based search engines and domain-relevant search engines that are presented to a user;

means for displaying the received documents to the user;

means for assembling the received documents from the plurality of sites searched by the selected particular search engines into a single list after eliminating documents not reachable via the web;

means for assigning relevance ranks to the received documents in the single list and for organizing the documents in the single list according to said relevance ranks;

means for clustering the received documents into clusters according to an unsupervised clustering procedure;

and means for displaying said single list and said clusters to the user.

33. The computer system of claim 32, wherein said means for assigning relevance ranks assigns the relevance rank based upon a frequency of occurrence of query terms in each of the received documents.

34. The computer system of claim 32, further comprising:

means for providing customized stop word lists to be used with regard to said generic, web-based search engines and domain-relevant search engines, wherein said means for assigning relevance ranks references said stop word lists to strip stop words from documents associated with a respective engine for which the particular stop word list being referred to has been customized, prior to determining a frequency of terms that appear within each said document, and wherein said terms are used to determine proximity scores between said documents.

35. The computer system of claim 32, wherein said unsupervised clustering procedure performed by means for clustering employs a group-average-linkage technique to determine relative distances between documents.

36. The computer system of claim 35, wherein said group-average-linkage technique employs the following algorithm for determining a proximity score that defines said relative distances between documents:

$$S_{ij}=2\times(\frac{1}{2}-N(T_i,T_j)/(N(T_i)+N(T_j)));$$

where $T_i$ is a term in document i;

$T_j$ is a term in document j;

$N(T_i,T_j)$ is the number of co-occurring terms that documents i and j have in common;

$N(T_i)$ is the number of terms found in document i; and $N(T_j)$ is the number of terms in document j.

37. The computer system of claim 32, further comprising:

means for categorizing the received documents, so that each document is assigned to one of a predefined number of categories; and means for displaying said categories and said documents assigned thereto to the user.

38. The computer system of claim 37, further comprising means for storing a list of words for each of said categories wherein said words in each list are particular to the respective category, and wherein said means for categorizing compares the words in a particular list to a document to be characterized to determine whether the document is classified in that particular category.

39. The computer system of claim 37, further comprising means for providing a predefined list of words for each of the categories.

40. The computer system of claim 37, further comprising means for automatically generating a word list for each of the categories.

41. The computer system of claim 40, wherein said word lists are prepared from a set of training documents.

42. The computer system of claim 40, wherein each word automatically selected for the generation of the word lists is identified based on a function computed from a frequency of occurrence of the word in the particular category for which it is selected, relative to a frequency of occurrence of the word in the other existing categories.

43. The method of claim 40, wherein said word lists are prepared by incremental training using previously selected lists of words and corresponding categories, as well as user feedback regarding the categorization of at least one of the documents contained in at least one of the categories.

44. The computer system of claim 32, further comprising:

means for storing said received documents; and means for performing a sub-query inputted by a user to search for documents stored by said means for storing which are relevant to said sub-query;

means for fetching raw data sub-query search results from said means for storing in the form of text documents;

means for displaying said raw data sub-query search results to the user;

means for assembling the raw data sub-query search results into a single list;

means for assigning relevance ranks to the raw data sub-query search results and for organizing the results in the single list according to said relevance ranks;

means for clustering the received sub-query documents into clusters according to an unsupervised clustering procedure;

and means for displaying said sub-query documents to the user in the single list and clusters formats.

45. The computer system of claim 32, further comprising:

a browser including a relevance feedback mechanism, adapted to analyze the documents as they are browsed by a user on a user interface; and to generate a relevance weighting factor based upon observations resulting from the analysis.

46. A computer system for searching both general and domain-specific information resources simultaneously pursuant to a user query and for obtaining organized search results therefrom, the system comprising:

a metasearch engine capable of accessing a plurality of sites including generic, web-based search engines and domain-relevant search engines for receiving documents from said plurality of sites in response to the user query;

means for selecting particular search engines from a plurality of generic, web-based search engines and domain-relevant search engines that are presented to a user;

means for clustering the received documents into clusters according to an unsupervised clustering procedure;

means for preparing a single list of all the documents, independently of said forming clusters, after oliminating documents not reachable via the web;

means for categorizing the received documents, so that each document is assigned to one of a predefined number of categories; and means for displaying said clusters, said categories and said documents assigned thereto to the user.

47. The computer system of claim 46, further comprising:

means for displaying the received documents to the user;

means for assigning relevance ranks to the received documents in the single list and for organizing the documents in the single list according to said relevance ranks;

means for storing said received documents; and means for performing a sub-query inputted by a user to search for documents stored by said means for storing which are relevant to said sub-query;

means for fetching raw data sub-query search results from said means for storing in the form of text documents;

means for displaying said raw data sub-query search results to the user;

means for assembling the raw data sub-query search results into a single list;

means for assigning relevance ranks to the raw data sub-query search results and for organizing the results in the single list according to said relevance ranks;

means for clustering the received sub-query documents into clusters according to an unsupervised clustering procedure;

means for categorizing the received sub-query documents, so that each document is assigned to one of a predefined number of categories; and means for displaying said sub-query documents to the user in the single list, categories and clusters formats.

48. The computer system of claim 46, further comprising:

a browser including a relevance feedback mechanism, adapted to analyze the documents as they are browsed by a user on a user interface; and to generate a relevance weighting factor based upon observations resulting from the analysis.

49. A computer readable medium carrying one or more sequences of instructions from a user of a computer system for searching both general and domain-specific information resources simultaneously to obtain organized search results therefrom, wherein execution of the one or more sequences of instructions by one or more processors causes the one or more processors to perform the steps of:

receiving a query inputted by the user and receiving instructions as to which databases to access;

accessing selected sites using generic, web-based search engines and domain-relevant search engines, based upon said instructions received from the user, and searching for documents on the selected sites, which are relevant to said query;

fetching raw data search results in the form of text documents from each of the selected sites;

displaying said raw data on a user interface;

forming clusters of related documents form said raw data, according to an unsupervised clustering procedure and processing said raw data, independently of said unsupervised clustering procedure, and categorizing said documents so that each document is assigned to one of a predefined number of categories; and displaying said clusters of related documents on the user interface.

50. The computer readable medium of claim 49, wherein the following further steps are performed:

preparing a single list of all of said documents, independently of said forming clusters, after eliminating documents not reachable via the web; and assigning simple relevance scores to said documents prepared in said single list, based upon a frequency of terms from said query that appear within each said document.

51. The computer readable medium of claim 50, wherein the following further step is performed:

providing customized stop word lists to be used with regard to said generic, web-based search engines, publication sites and sequences sites, and referencing said stop word lists to strip stop words from documents associated with a respective engine, publication site or sequence site for which the particular stop word list being referred to has been customized, prior to determining said frequency of terms that appear within each said document and using the terms to compute proximity scores between the documents for clustering the documents.

52. The computer readable medium of claim 49, wherein the following further steps are performed:

providing a browser including a relevance feedback mechanism;

analyzing the documents as they are browsed by the user; and generating a relevance weighting factor based upon observations resulting from said analyzing.

* * * * *